Patented July 6, 1948

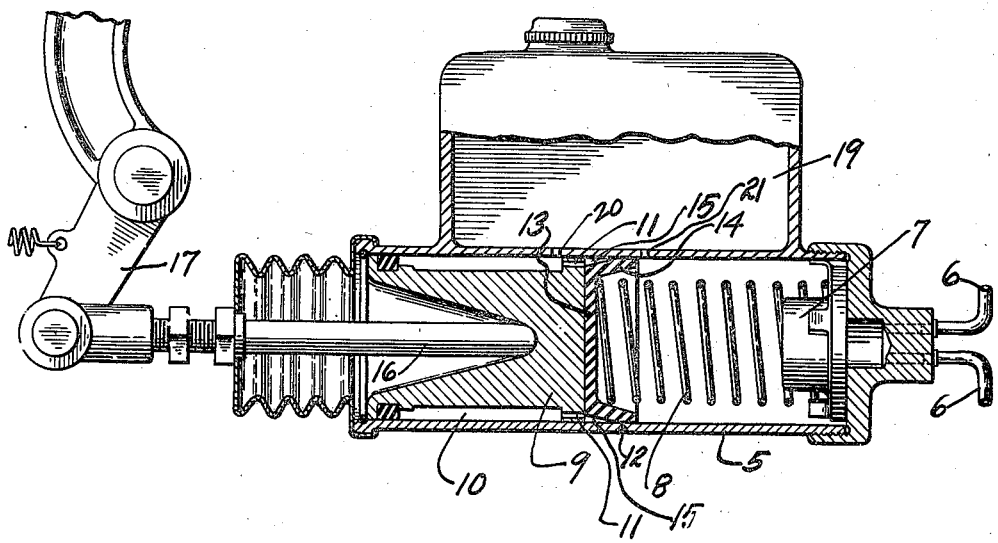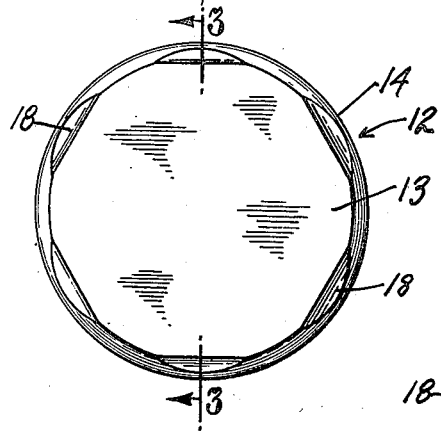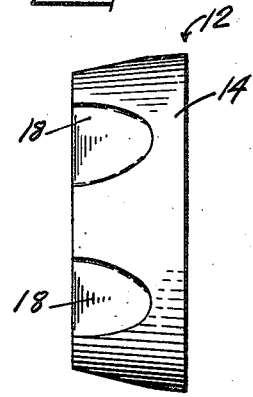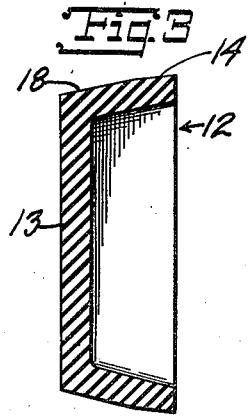

2,444,569

UNITED STATES PATENT OFFICE 2,444,569

PACKING CUP FOR MASTER PISTONS

Morris Katcher, New York, N. Y.

Application March 11, 1943, Serial No. 478,743

3 Claims. (Cl. 60—54.6)

This invention relates to hydraulic brake systems, and particularly to improvements in the pistons for the master cylinders of said systems. An object is to provide a master piston for the master cylinder which piston has thereon a packing member adapted to facilitate the passage of liquid by the packing member to the front of the cylinder during the retraction of the piston. The normally cylindrical periphery of the packing member has flattened areas or facets formed upon it to facilitate said passage. The use of flattened areas provides spaces which are less likely to clog than the grooves used in the prior art. Said packing member during the forward stroke of the piston engages the inside of the cylinder wall, preventing thereby the passage of fluid to the rear of the piston.

Other objects and advantages of the invention will become apparent upon further study of the description and drawing, in which:

Fig. 1 is a longitudinal section, partially in elevation, of the master cylinder with its operating appurtenances.

Fig. 2 is a rear elevation of the packing cup, shown by itself, to an enlarged scale.

Fig. 3 is a section through the packing cup taken along the line 3—3 of Fig. 2, and Fig. 4 is a side elevation of the packing cup shown by itself.

Master cylinder 5 of a hydraulic brake system has two tubes 6 which lead to the wheel brake cylinders, the latter not being shown. A double acting check valve 7 is mounted at the forward end of cylinder 5, which is the end from which tubes 6 lead. Said valve performs the function of maintaining a slight positive pressure in the fluid system, as is well known in the art, including the fluid pressure in the wheel brake cylinders and the connecting pipes, thus greatly reducing the possibility of the admission of air into master cylinder 5. Spring 8 normally holds piston 9 in its retracted or rear position in cylinder 5. Piston 9 is provided with an annular groove 10. Bleed passages 11 extend through the head of the piston from groove 10. Held against the front of piston 9 by spring 8 is a cup-shaped packing member 12, having a disk portion 13 and a flexible flange 14. The material of the packing member is preferably of rubber or the like, although it will be seen that if bleed passages 11 are in register with spaces 15 between the member and the cylinder wall, disk portion 13 could be made of stiffer material. When piston 9 is pushed forward by rod 16 under the impetus of manually operable brake crank 17, the pressure of the liquid in front of packing member 12, presses flange 14 from its inside radially outward against the wall of cylinder 5, effectively sealing off bleed passages 11 against the rearward passage of liquid through the piston head to groove 10.

The outer surface or periphery of packing member 12 has flattened areas or facets 18 on it, which facets extend from the rear of the member almost to its front. When piston 9 is withdrawn to the rear of cylinder 5 from the forward end thereof, liquid passes forwardly through bleed passages 11 and over flexible flange 14, bending the latter radially inward. It will be remembered that check valve 7 acts to resist to a great extent the entrance of fluid from tubes 6. The presence of facets 18 facilitates this forward passage of the liquid.

The length of groove 10 is sufficient so that it can receive liquid during piston's 9 entire forward stroke, from reservoir 19 through port 20 in the cylinder wall. Another port 21 from reservoir 19 is provided in the cylinder wall just in front of flange 14 when the piston is completely retracted. At the end of the retractive movement of piston 9, there is a greater quantity of fluid in cylinder 9 and in the tubes 6 and in the fluid pressure wheel brake cylinders than is necessary for the operation of the system. As a result of this condition, continued cylinderwise movement of the fluid, as the wheel cylinder pistons move to their retractive position, will cause all excess fluid returning to cylinder 9, against the action of check valve 7, to pass up through port 21 into reservoir 19.

I claim:

1. In a hydraulic brake system, a master cylinder, a piston, with bleed passages therethrough, movable in the cylinder, a fluid supply source in constant communication with the rear of said passages, and a cup-shaped flexible packing member having a radially extending rear portion and a circumferential flange extending forward axially from the rim of said rear portion, said rear portion being held seated on the front of the piston, the radially outermost surface of said member being engageable with the wall of the cylinder except for a plurality of spaced depressed areas, which areas extend axially from the rear of the member almost to the forward edge of the flange, each of said areas extending circumferentially of the member a distance at least substantially equal to said axial extent, the rear of the member at said areas being in contact with the front of the piston and radially inward of the passages, flow through the passages being closed by the packing member during forward movement of the piston, the spaces, engendered by said areas, between the wall of the cylinder and the member and the flexibility of the member, allowing the fluid to pass readily through the passages and over the member during rearward movement of the piston.

2. A cup-shaped packing member for cooperation with a master cylinder and a piston with a plurality of bleed passages therethrough, said piston being movable in the cylinder, said packing member having a radially extending rear portion and a flexible flange extending forward axially from the rim of said rear portion, said rear portion being held seated on the forward end of the piston and the flange being engageable with the wall of the cylinder, blocking off flow through said passages during the forward or compression movement of the piston and permitting forward flow of fluid through said passages and over the radially outermost surface of the packing member during rearward movement of the piston, said member having a plurality of spaced depressions on its radially outermost surface, said depressions extending axially from the rear of the member to almost the forward edge of the flange and extending circumferentially of the member a distance at least substantially equal to said axial extent, giving rise to substantial spaces between the wall of the cylinder and the member to facilitate forward flow of fluid past said member, the rear of said member at its periphery being in contact with the forward end of the piston during the forward movement of the latter.

3. A cup-shaped packing member for cooperation with a master cylinder and a piston with a plurality of bleed passages extending therethrough, said piston being movable in the cylinder, said packing member having a radially extending rear portion and a flexible circumferential flange extending forward axially from the rim of said rear portion, said rear portion being located on the forward end of the piston, the rear of said member at its periphery being in contact with the forward end of the piston, said member blocking off flow through said passages during the forward movement of the piston and permitting forward flow of fluid through said passages and over the packing member during rearward movement of the piston, said member, having a plurality of spaced depressions on its radially outermost surface, said depressions extending axially from the rear of the member almost to its front and extending circumferentially of the member a distance at least substantially equal to said axial extent, said depressions at their rear being in line with the forward end of the passages and located radially inward sufficiently to expose said end, said packing member being engageable during the forward stroke of the piston for substantially its axial length and perimeter, except at the depressions, with the wall of the cylinder, the depressions giving rise to substantial spaces between the wall of the cylinder and the member to facilitate forward flow of fluid past said member during the rearward stroke of the piston.

MORRIS KATCHER.

REFERENCES CITED

The following references are of record in the file of this patent:

UNITED STATES PATENTS

| Number | Name | Date |
| --- | --- | --- |
| 1,733,936 | Boughton | Oct. 29, 1929 |
| 2,029,367 | Geyer | Feb. 4, 1936 |
| 2,036,038 | Gottlieb | Mar. 31, 1936 |
| 2,036,342 | Loweke | Apr. 7, 1936 |
| 2,054,863 | Oliver | Sept. 22, 1936 |
| 2,118,604 | Heidloff | May 24, 1938 |
| 2,245,991 | Loweke | June 17, 1941 |
| 2,254,937 | Dick | Sept. 2, 1941 |
| 2,335,069 | Loweke | Nov. 23, 1943 |